US011039608B2

(12) United States Patent
Lin et al.

(10) Patent No.: US 11,039,608 B2
(45) Date of Patent: Jun. 22, 2021

(54) BATTERY-FREE ELECTRIC MOSQUITO SWATTER

(71) Applicant: FUJIAN NASHIDA ELECTRONIC INCORPORATED COMPANY, Fujian (CN)

(72) Inventors: Cuiwen Lin, Fuzhou (CN); Jiangqun Chen, Fuzhou (CN); Zhou Lin, Fuzhou (CN); Huiyang Zheng, Fuzhou (CN); Xiujin Yang, Fuzhou (CN)

(73) Assignee: Nine Stars Group (U.S.A.) Inc., Chino, CA (US)

( * ) Notice: Subject to any disclaimer, the term of this patent is extended or adjusted under 35 U.S.C. 154(b) by 83 days.

(21) Appl. No.: 16/097,829

(22) PCT Filed: Oct. 18, 2016

(86) PCT No.: PCT/CN2016/102297
§ 371 (c)(1),
(2) Date: Oct. 30, 2018

(87) PCT Pub. No.: WO2018/010328
PCT Pub. Date: Jan. 18, 2018

(65) Prior Publication Data
US 2019/0133107 A1    May 9, 2019

(30) Foreign Application Priority Data

Jul. 12, 2016 (CN) .......................... 201620725421.5
Oct. 18, 2016 (WO) ................ PCT/CN2016/102297

(51) Int. Cl.
*A01M 3/02*    (2006.01)
*A01M 1/22*    (2006.01)
*H02N 11/00*   (2006.01)

(52) U.S. Cl.
CPC .............. *A01M 3/025* (2013.01); *A01M 1/22* (2013.01); *A01M 3/02* (2013.01); *H02N 11/002* (2013.01); *A01M 2200/012* (2013.01)

(58) Field of Classification Search
CPC .......... A01M 3/025; A01M 3/02; A01M 3/00; A01M 1/22; A01M 1/223; F21L 13/00;
(Continued)

(56) References Cited

U.S. PATENT DOCUMENTS 1,131,063 A  *  3/1915  Klemmer ................ F21L 13/08
                                                    310/75 B
1,512,467 A  *  10/1924 Johnson .................. F21L 13/08
                                                    362/192
(Continued)

FOREIGN PATENT DOCUMENTS

CN        2653837 Y  * 11/2004  ............. A01M 3/02
CN      202489104 U  * 10/2012  ............. A01M 3/02
(Continued)

OTHER PUBLICATIONS

Non-battery Rechargeable Mosquito Swatter, Kuan-Fu Liu and Yuan-Chun Lo, Apr. 13, 2016, http://1202.virtualclassroom.org/33_non_battery_rechargeable_mosquito_swatter.htm (Year: 2016).*

*Primary Examiner* — Joshua J Michener
*Assistant Examiner* — Arfan Y. Sinaki
(74) *Attorney, Agent, or Firm* — Raymond Y. Chan; David and Raymond Patent Firm (57) ABSTRACT

A battery-free electric mosquito swatter, comprising a flat swatting portion (1), a handle (2), a control circuit board (3), and a mechanical energy-based power generation device (5). The flat swatting portion (1) consists of a swatter frame and a swatter net. The flat swatting portion (1) is connected to the handle (2), the control circuit board (3) and the mechanical
(Continued)

energy-based power generation device (5) are disposed within the handle (2), and the swatting net and the mechanical energy-based power generation device (5) are electrically connected to the control circuit board (3). The mechanical energy-based power generation device (5) comprises a hand squeeze member (51), a gear transmission mechanism, and a power generator (57). The hand squeeze member (51) is provided with a curved gear rack (511) meshing with an input gear of the gear transmission mechanism. An output gear of the gear transmission mechanism drives a rotating shaft of a rotor of the power generator (57) to rotate. The power generator (57) is electrically connected to the control circuit board (3). The handle (2) is provided with a discharge button switch (4) used to short a positive and negative electrode of the swatter net. The electric mosquito swatter of the present invention does not require a battery, lowers a use cost, and reduces environmental pollution caused by waste batteries. In addition, the present invention provides a reasonable and reliable overall design and safety during use, has a long service life and a low cost, and is easy to assemble and ready for use immediately after squeezing, thus providing convenience and fun during use.

16 Claims, 6 Drawing Sheets

(58) Field of Classification Search
CPC . F21L 13/06; F21L 13/08; F21L 13/04; F21L 13/02
USPC ..... 43/137, 112; 322/40; 362/192, 157, 183, 362/193; 290/1 C; 310/10, 15, 27, 36, 310/37, 12.04, 12.12, 12.27, 50
See application file for complete search history.

(56) References Cited

U.S. PATENT DOCUMENTS

| | | | | |
|---|---|---|---|---|
| 2,390,877 | A * | 12/1945 | Fisher | F21L 13/08 310/156.08 |
| 3,573,479 | A * | 4/1971 | Rieth | F21L 13/08 290/1 E |
| 7,222,984 | B2 * | 5/2007 | Lee | F21L 13/06 320/123 |
| 7,893,551 | B2 * | 2/2011 | Dai | H02K 7/1853 290/1 C |
| 2004/0062039 | A1 * | 4/2004 | Ahn | G09F 13/22 362/192 |
| 2006/0098426 | A1 * | 5/2006 | Yen | F21L 13/06 362/192 |
| 2006/0098427 | A1 * | 5/2006 | Yeh | F21L 13/08 362/192 |
| 2007/0177377 | A1 * | 8/2007 | Ding | F21L 13/06 362/183 |
| 2009/0272026 | A1 * | 11/2009 | Su | A01M 3/025 43/137 |
| 2010/0088947 | A1 * | 4/2010 | Mars | A01M 3/025 43/112 |
| 2013/0162060 | A1 * | 6/2013 | Fukushima | G04C 3/143 310/37 |
| 2016/0309695 | A1 * | 10/2016 | Dayan | A01M 3/025 |

FOREIGN PATENT DOCUMENTS

| | | | | |
|---|---|---|---|---|
| CN | 103563875 | A * | 2/2014 | ............ A01M 3/02 |
| CN | 104663629 | A * | 6/2015 | ............ A01M 3/02 |
| GB | 2088651 | A * | 6/1982 | ............ F23Q 7/18 |

* cited by examiner

BATTERY-FREE ELECTRIC MOSQUITO SWATTER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to battery-free electric mosquito swatter, and more particularly, to an electric mosquito swatter that utilized mechanical energy-based power generation.

Description of Related Arts

After 22 years of development, electric mosquito swatter has been very common in the nation that almost every household has one or two electric mosquito swatters. Its throughput (including export) is about 100 million pieces per year. Unfortunately, because most of the conventional electric mosquito swatters utilize either rechargeable battery or disposable battery, the service life of an electric mosquito swatter is around 2 to 3 years, which makes it a low cost short life product that tends to be discarded as a garbage when damaged. Besides, the life of the rechargeable battery is limited. Most manufacturers put cheap lead-acid battery in their rechargeable electric mosquito swatters so as to lower the production cost and be competitive in the market. Both waste rechargeable batteries and disposable batteries render severe environmental pollution due to their tremendous quantities. In addition, if a battery electric mosquito swatter is utilized, the users can sometimes face a awkward situation that the battery is out when there are mosquitoes and bugs to be killed. Moreover, for those who live or work in remote mountain area or wild, where city power and battery provider are both absent, conventional electric mosquito swatter should not be an ideal choice. Before the present invention, there were a few patents regarding battery-free electric mosquito swatter, such as "Environment-friendly Electric Mosquito Swatter" (China Pat. No. 200920043880.5), which lacks of specific structure and is difficult to implement because it is nearly impossible to design a high transmission ratio and high strength transmission mechanism in such an extremely small handle. Therefore, it may require further creation. Another example is "Split-type Battery-free Electric Mosquito Swatter" (China Pat. No. 201220348142.3), which can only be utilized after its supercapacitor has charged for tens seconds to a few minutes. The technology is impractical because people must kill the mosquitoes and bugs right after they were spotted. The user would lose mosquitoes and bugs would be gone after ten seconds to a few minutes of waiting.

In order to overcome the above drawbacks of the conventional art, an object of the present invention is to provide a battery-free electric mosquito swatter.

SUMMARY OF THE PRESENT INVENTION

In order to overcome the above drawbacks of the conventional art, an object of the present invention is to provide a battery-free electric mosquito swatter.

The present invention provides a battery-free electric mosquito swatter, comprising a flat swatting portion, a handle, a control circuit board having at least a high voltage capacitor arranged thereon, and a mechanical energy-based power generation device having a rotor with a rotating shaft arranged thereon. The flat swatting portion comprises a swatter frame and a swatter net coupling with each other. The flat swatting portion is connected to the handle. The control circuit board and the mechanical energy-based power generation device are disposed in said handle. The swatting net and the mechanical energy-based power generation device are electrically connected with the control circuit board. The mechanical energy-based power generation device comprises a hand squeeze member, a gear transmission mechanism having an input gear and an output gear arranged thereon, and a power generator. The hand squeeze member comprises a curved gear rack meshing with the input gear of the gear transmission mechanism. The output gear of the gear transmission mechanism drives the rotating shaft of the rotor of the power generator to rotate. The power generator is electrically connected to the control circuit board.

Further, the gear transmission mechanism comprises a first duplex gear, a second gear, a third gear, a fourth duplex gear, and a fifth output gear orderly connected for transmission. The first duplex gear and the fourth duplex gear respectively comprise a pinion gear and a bull gear. The pinion gear of the first duplex gear serves as the input gear and is meshed with the curved gear rack on the hand squeeze member. The bull gear of the first duplex gear is meshed with the second gear for transmission. The second gear and the third gear are coaxial and unidirectionally drivably engaged through a ratchet wheel and a pawl thereof respectively. The pinion gear of the fourth duplex gear is meshed with the third gear for transmission. The bull gear of the fourth duplex gear is meshed with the fifth output gear for transmission. The fifth output gear is affixed on the rotating shaft of the rotor of the power generator.

Further, the handle comprises an upper handle cover and a lower handle cover coupling with each other. An end of the hand squeeze member is connected with the handle through the hand squeeze member rotating shaft. The handle comprises a first rotating shaft, a second rotating shaft, and a third rotating shaft arranged therein. The first duplex gear is arranged on said first rotating shaft. The second gear and the third gear are arranged on the second rotating shaft. The fourth duplex gear is arranged on the third rotating shaft. The upper handle cover and said lower handle cover have a plurality of cylindrical bores arranged on the inner sides thereof for rotatably affixing the hand squeeze member rotating shaft, the first rotating shaft, the second rotating shaft, and the third rotating shaft.

Further, the lower handle cover has a curvy boss arranged on the inner side thereof for mounting the power generator. The power generator further comprises a motor plate arranged on the upper part thereof. The motor plate is coupled with the lower handle cover through screw bolt.

Further, the handle comprises a discharge button switch for shorting the positive and negative electrodes of the swatter net.

Further, the discharge button switch is arranged on the upper handle cover and comprises a button, a spring, a button retaining plate, and a discharge sheetmetal. The button comprises a column arranged on the lower portion thereof. The button retaining plate has a through hole arranged thereon adapted for the column to pass through. The button retaining plate is affixed in the upper handle cover. The spring is sleeved on the column between the button and the button retaining plate. The discharge sheetmetal is affixed on the bottom of the column.

Further, the pinion gear of the first duplex gear has 10 teeth, the bull gear of the first duplex gear has 40 teeth, and the module (m) thereof is 0.7. The second gear has 11 teeth and the module (m) thereof is 0.7. The third gear has 47 teeth and the module (m) thereof is 0.6. The pinion gear of the fourth duplex gear has 10 teeth and the module (m) thereof is 0.6 and the bull gear of the fourth duplex gear has 56 teeth and the module (m) thereof is 0.5. The fifth output gear has 11 teeth and the module (m) thereof is 0.5. The transmission ratio of the gear transmission mechanism is 87 times.

Further, the hand squeeze member has a groove arranged on the end that the hand squeeze member rotating shaft is mounted on. Besides, the groove comprises a torsion spring provided and arranged therein.

Contrasting with the conventional art, the present invention has the following advantages: battery-free, does not require charging from external electric supply, lower utilizing cost, lower environmental pollution caused by waste batteries, reasonable and reliable overall design and safety in use, long service life, lower production cost, easy to assemble, ready for use immediately after squeezing, and convenient and interesting for the utilizing.

More details of the present invention are provided as follows with appended drawings and embodiments.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1-11, a battery-free electric mosquito swatter comprises a flat swatting portion 1, a handle 2, a control circuit board 3 having at least a high voltage capacitor 31 arranged thereon, and a mechanical energy-based power generation device 5 having a rotor with a rotating shaft arranged thereon. The flat swatting portion 1 comprises a swatter frame and a swatter net coupling with each other. The flat swatting portion 1 is connected to the handle 2. The control circuit board 3 and the mechanical energy-based power generation device 5 are disposed in the handle 2. The swatting net and the mechanical energy-based power generation device 5 are electrically connected with the control circuit board 3. The mechanical energy-based power generation device 5 comprises a hand squeeze member 51, a gear transmission mechanism having an input gear and an output gear arranged thereon, and a power generator 57. The hand squeeze member 51 comprises a curved gear rack 511 meshing with the input gear of the gear transmission mechanism. The output gear of the gear transmission mechanism drives the rotating shaft of the rotor of the power generator 57 to rotate. The power generator 57 is electrically connected to the control circuit board 3. When a user presses the hand squeeze member 51 of the mechanical energy-based power generation device 5, the power generator 57 of the mechanical energy-based power generation device 5 will rotate at high speed and supply energy to the control circuit board 3. Then the control circuit board 3 will convert the low voltage electricity to high voltage electricity and store the electric charge in the high voltage capacitor 31. The two ends of the high voltage capacitor 31 are respectively connected to the positive electrode H and negative electrode 12 of the flat swatting portion 1, such that the flat swatting portion 1 can be utilized to kill mosquitoes and bugs.

According to the present embodiment, the gear transmission mechanism comprises a first duplex gear 52, a second gear 53, a third gear 54, a fourth duplex gear 55, and a fifth output gear 56 orderly connected for transmission. The first duplex gear 52 and the fourth duplex gear 55 respectively comprise a pinion gear and a bull gear. The pinion gear of the first duplex gear serves as the input gear and is meshed with the curved gear rack 511 on the hand squeeze member 51. The bull gear of the first duplex gear 52 is meshed with the second gear 53 for transmission. The second gear 53 and the third gear 54 are coaxial and unidirectionally drivably engaged through a ratchet wheel 531 and a pawl 541 thereof respectively. The pinion gear of the fourth duplex gear 55 is meshed with the third gear 54 for transmission. The bull gear of the fourth duplex gear 55 is meshed with the fifth output gear 56 for transmission. The fifth output gear 56 is affixed on the rotating shaft of the rotor of the power generator 57.

According to the present embodiment, the handle 2 comprises an upper handle cover 21 and a lower handle cover 22 coupling with each other. An end 512 of the hand squeeze member 51 is connected with the handle 2 through the hand squeeze member rotating shaft 514. The handle 2 has a first rotating shaft 521, a second rotating shaft 532, and a third rotating shaft 551 arranged therein. The first duplex gear 52 is arranged on the first rotating shaft 521. The second gear 53 and the third gear 54 are arranged on the second rotating shaft 532. The fourth duplex gear 55 is arranged on the third rotating shaft 551. The upper handle cover 21 and the lower handle cover 22 have a plurality of cylindrical bores 211, 212, 213, 214, 221, 222, 223, 224 arranged on the inner sides thereof for rotatably affixing the hand squeeze member rotating shaft 514, the first rotating shaft 521, the second rotating shaft 532, and the third rotating shaft 551. Besides of the fifth output gear 56, all gears and rotating shafts, including the hand squeeze member rotating shaft, are rotatably affixed in the cylindrical bores 211, 212, 213, 214, 221, 222, 223, 224 on the inner sides of the upper handle cover 21 and the lower handle cover 22, such that it does not require an additional shell for the transmission mechanism, which saves the cost and space.

Figure 1:
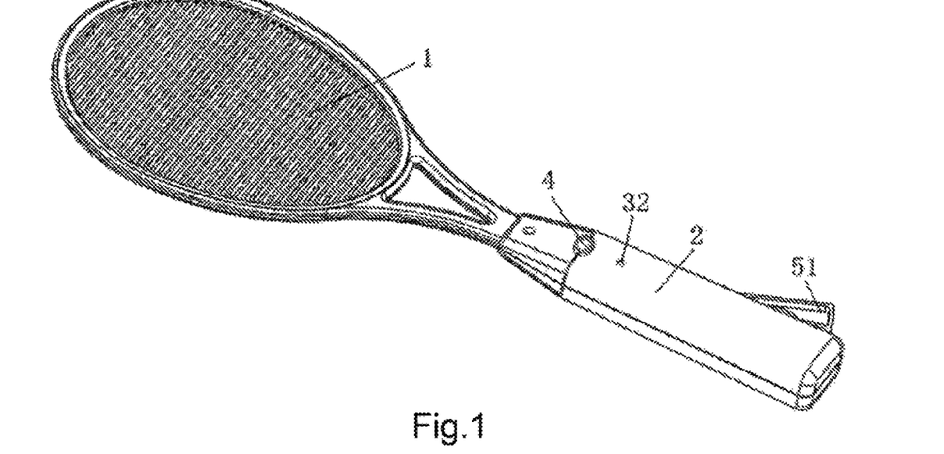
FIG. 1 is a perspective view illustrating an exterior structure of the present invention.
Figure 2:
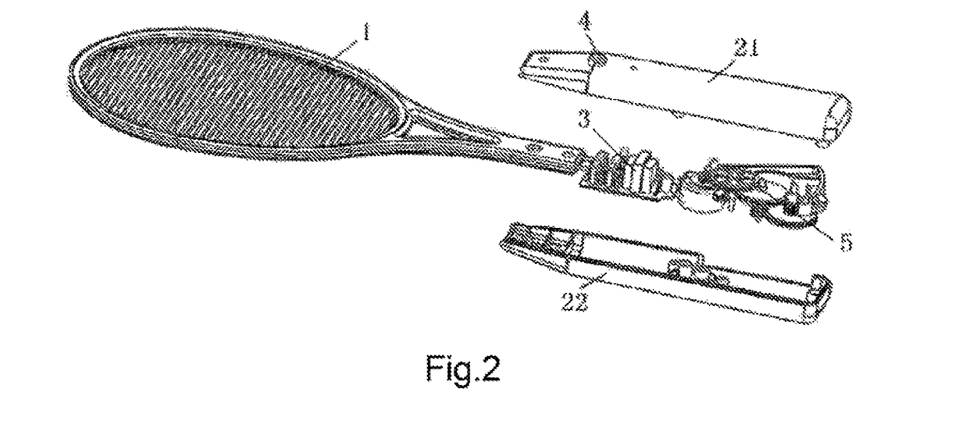
FIG. 2 is an exploded view illustrating a specific structure of the present invention.
Figure 3:
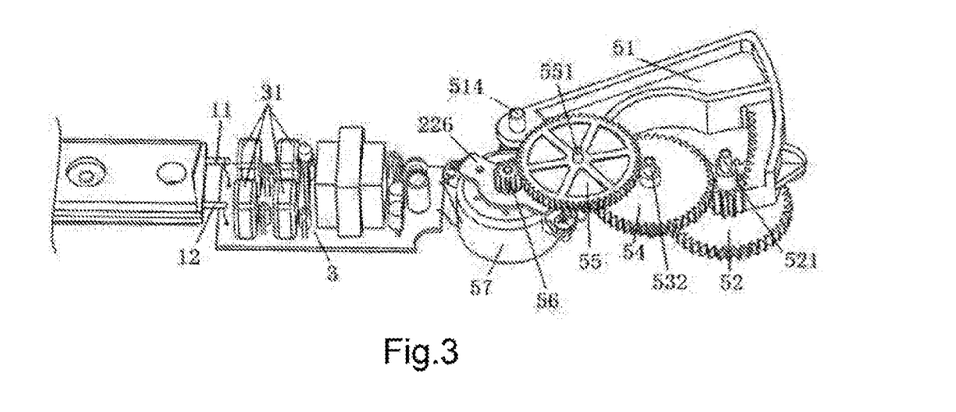
FIG. 3 is a perspective view illustrating an internal structure of the present invention.
Figure 4:
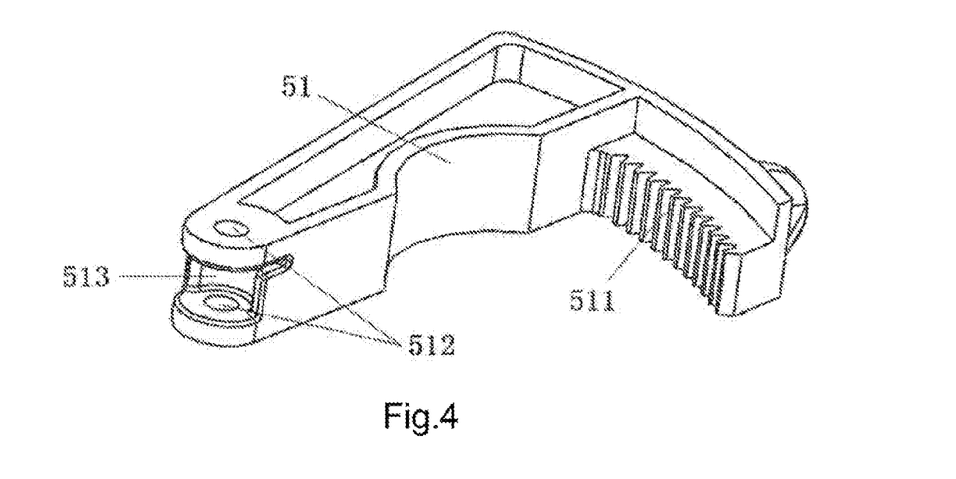
FIG. 4 is a perspective view illustrating the structure of a hand squeeze member according to the present invention.
Figure 5:
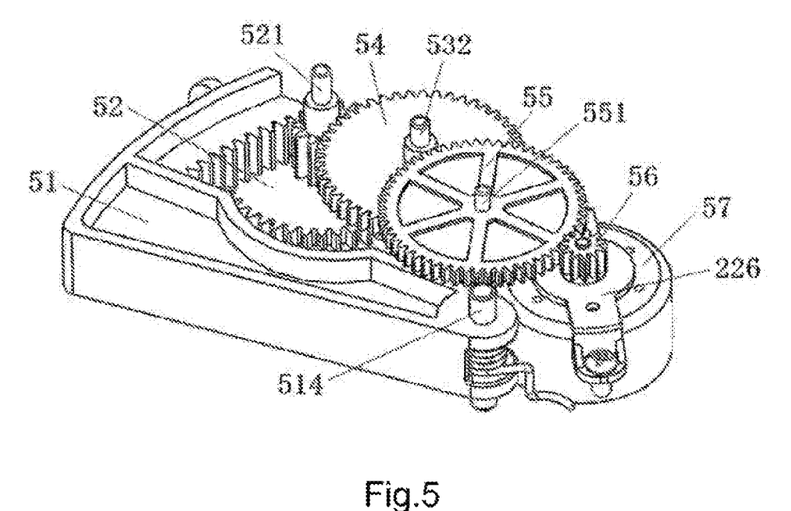
FIG. 5 is a perspective view illustrating an upper structure of a mechanical energy-based power generation device according to the present invention.
Figure 6:
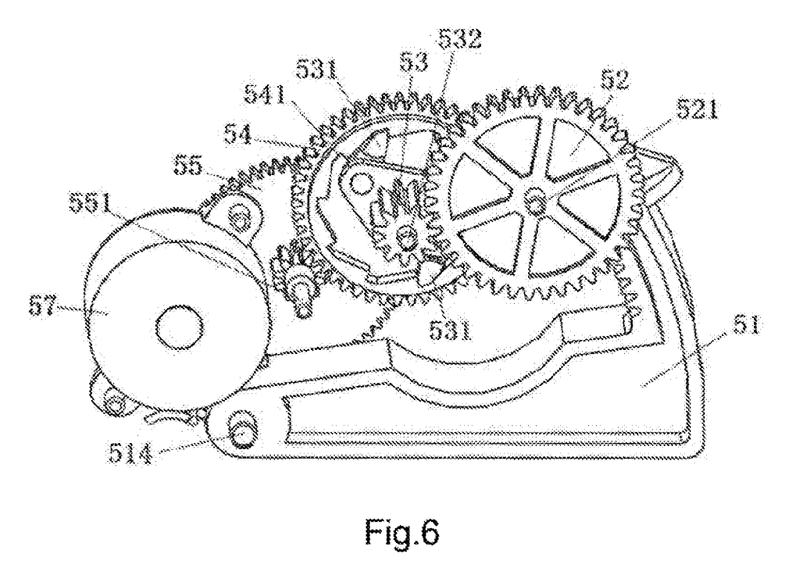
FIG. 6 is a perspective view illustrating a lower structure of the above mechanical energy-based power generation device according to the present invention.
Figure 7:
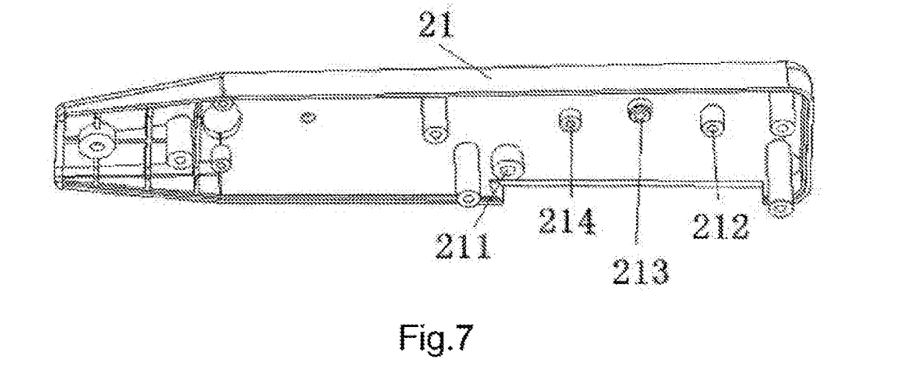
FIG. 7 is a perspective view illustrating the structure of an upper handle cover according to the present invention.

According to the present embodiment, the hand squeeze member 51 has a groove 513 provided on the end that the hand squeeze member rotating shaft 514 is mounted on. The groove 513 comprises a torsion spring 515 provided and arranged therein in order to reposition the hand squeeze member 51. When the user presses the hand squeeze member 51, the curved gear rack 511 on the hand squeeze member 51 will drive the pinion gear (input gear) of the first duplex gear 52 to rotate. Then the bull gear of the first duplex gear 52 will drive the second gear 53 to rotate. The second gear 53 will, through the ratchet wheel 531 and pawl 541, drive the third gear 54 to rotate. The third gear 54 will drive the pinion gear of the fourth duplex gear 55 to rotate, so the bull gear of the fourth duplex gear 55 can drive the fifth output gear 56 to rotate. The fifth output gear 56 will then drive the rotor of the power generator 57 to rotate, such that the power generator 57 can supply power to the control circuit board 3. Because there will be resistance from cutting-of-flux of the rotor of the power generator 57, the user can feel heavier when pressing the hand squeeze member 51. When the user releases the hand squeeze member 51, the torsion spring 515 will reposition the hand squeeze member 51. As a result, the reversing rotation 511 on the hand squeeze member 51 will drive the pinion gear (input gear) of the first duplex gear 52 to reverse rotate. Then the bull gear of the first duplex gear 52 will drive the second gear 53 to reverse rotate. Nevertheless, because the ratchet wheel 531 and pawl 541 only allow unidirectional driving, the third gear 54 will not be driven to rotate. Therefore, the repositioning of the hand squeeze member 51 is easy and light, which can be achieved through the torsion spring 515 only.

Figure 8:
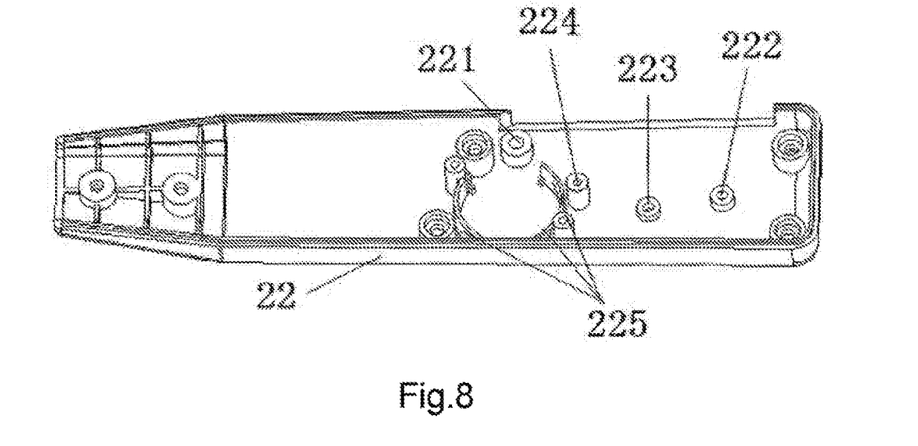
FIG. 8 is a perspective view illustrating the structure of a lower handle cover according to the present invention.
Figure 9:
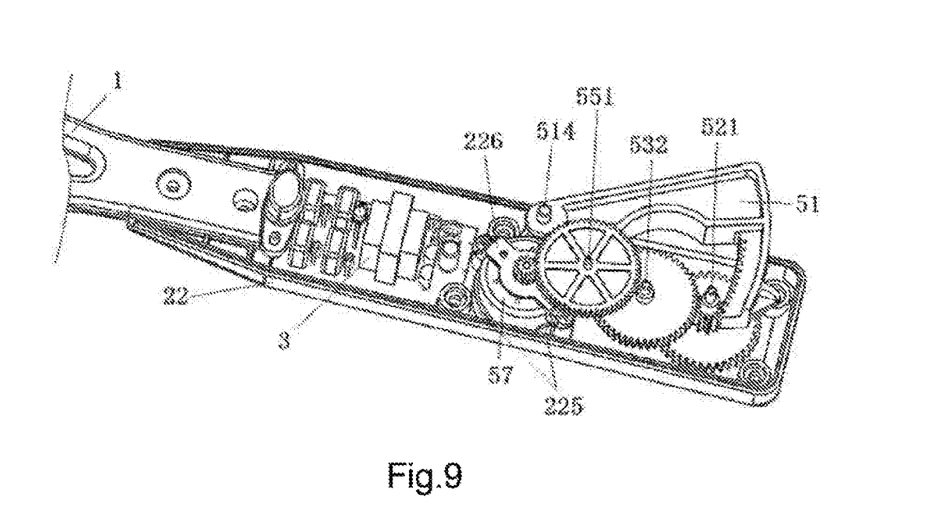
FIG. 9 is a perspective view illustrating the assembly of the internal structure of a handle according to the present invention.

According to the present embodiment, the lower handle cover 22 has a curvy boss 225 arranged on the inner side thereof for mounting the power generator 57 so as to affix the power generator 57 at position accurately. The power generator 57 further comprises a motor plate 226 arranged on the upper part thereof. The motor plate 226 is coupled with the lower handle cover 22 through screw bolt.

According to the present embodiment, since the power supply of the circuit board relies on mechanical energy power generation by pressing the hand squeeze member 51, the supply can only exist in a relatively short moment. Even if the hand squeeze member 51 has been pressed for more times, it can only provide an intermittent power supply. Nevertheless, the high voltage capacitor 31 on the circuit board can store electric charge for a longer time. Therefore, electric charge stored in the high voltage capacitor 31 generated by one or two pressing will be sufficient to kill a few mosquitoes and bugs. The high voltage capacitor 31 stores no more than 45 μC of electric charge according to the international safety standard. A difference from the conventional technology is that it does not require discharge resistors to be connected to the two ends of the high voltage capacitor 31 or the discharge resistors are replaced from ten trillion ohms to one hundred trillion ohms. Then based on security concern, there is a discharge button switch 4 arranged on the handle 2 for shorting the leads of the positive electrode 11 and negative electrode 12 of the swatter net. When the discharge button switch 4 is pressed, the electric charge stored in the high voltage capacitor 31 will be released.

Figure 10:
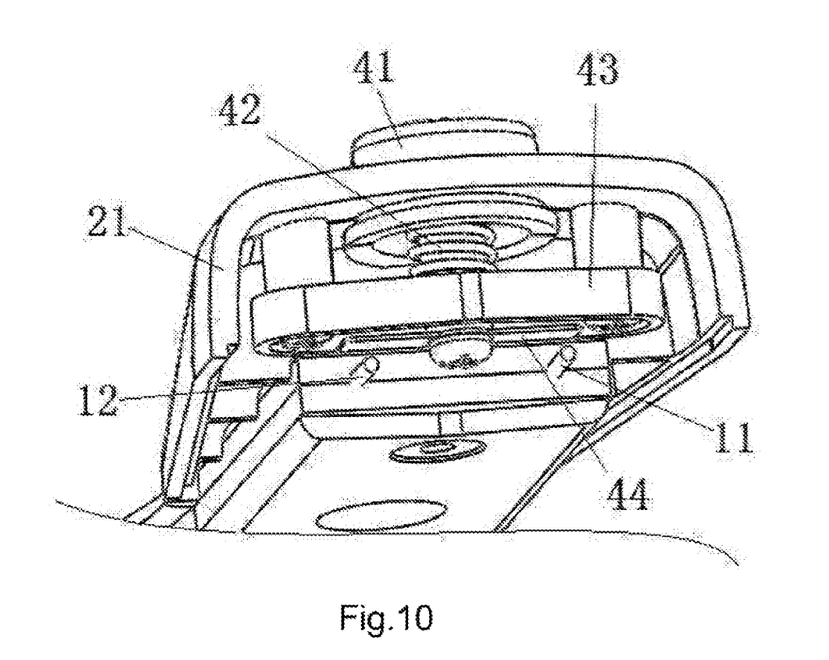
FIG. 10 is a perspective view illustrating the structure of a discharge button switch according to the present invention.
Figure 11:
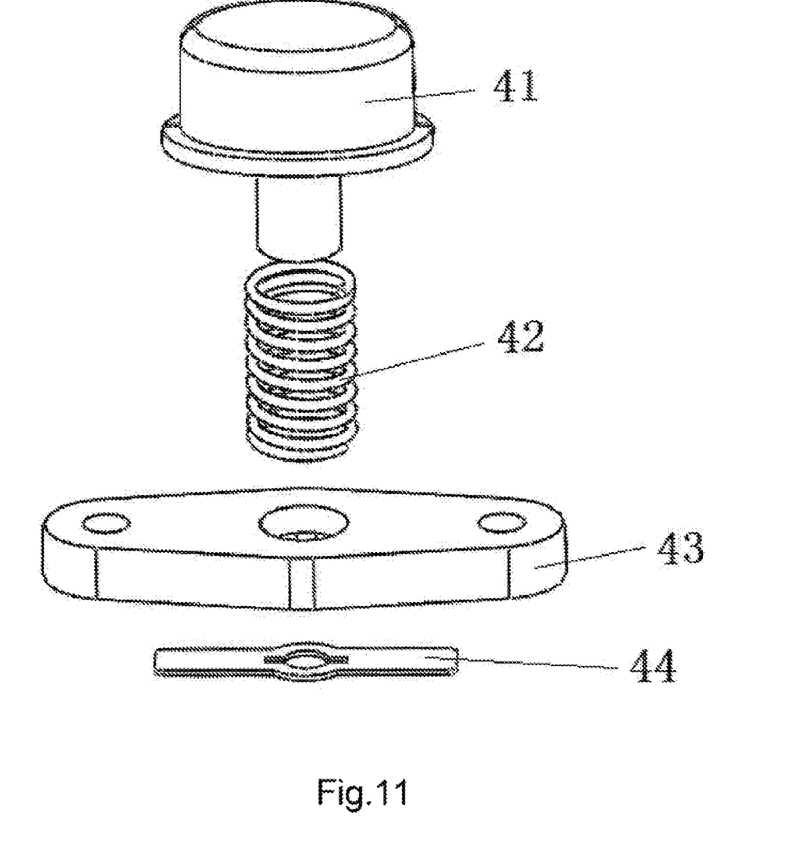
FIG. 11 is an exploded view illustrating the structure of the above discharge button switch according to the present invention.

According to the present embodiment, the discharge button switch 4 is arranged on the upper handle cover and consists of a button 41, a spring 42, a button retaining plate 43, and a discharge sheetmetal 44. The button 41 comprises a column arranged on the lower portion thereof. The button retaining plate 43 has a through hole arranged thereon adapted for the column to pass through. The button retaining plate 43 is affixed in the upper handle cover 21. The spring 42 is sleeved on the column between the button 41 and the button retaining plate 43. The discharge sheetmetal 44 is affixed on the bottom of the column under the button 41. When the discharge button switch 4 is pressed, the discharge sheetmetal 44 of the discharge button switch 4 will short the lead wires of the positive electrode 11 and the negative electrode 12, so as to release the electric charge stored in the high voltage capacitor 31. The discharge button switch 4 has been installed on the upper handle cover 2 to form a single assembly, such that it does not require further wire connection, which is convenient for the entire assembling process.

According to the present embodiment, the pinion gear of the first duplex gear 52 has 10 teeth, the bull gear of the first duplex gear has 40 teeth, and the module (m) thereof is 0.7. The second gear 53 has 11 teeth and the module (m) thereof is 0.7. The third gear 54 has 47 teeth and the module (m) thereof is 0.6. The pinion gear of the fourth duplex gear 55 has 10 teeth and the module (m) thereof is 0.6 and the bull gear of the fourth duplex gear has 56 teeth and the module (m) thereof is 0.5. The fifth output gear 56 has 11 teeth and the module (m) thereof is 0.5. The transmission ratio of the gear transmission mechanism is 87 times.

The above is just a preferred embodiment of the present invention. All equivalences and modifications within the spirit of the appended claims of the present invention are with the scope of the present invention.

One skilled in the art will understand that the embodiment of the present invention as shown in the drawings and described above is exemplary only and not intended to be limiting.

Objectives of the present invention are completely and effectively implemented. Notions of the functions and structures of the present invention have been shown and described in the embodiments, whereas implementations of the present invention may have modifications or changes in any ways without going against the above notions.

What is claimed is:

1. A battery-free electric mosquito swatter, comprising:
a handle which comprises a discharge button switch;
a swatting portion which comprises a swatter frame coupled to said handle and a swatter net coupled at said swatter frame;
a control circuit board, having at least a high voltage capacitor, disposed in said handle to connect to said discharge button switch, wherein said control circuit board is a discharge-resistor free device to be connected to said high voltage capacitor; and
a mechanical energy-based power generation device, which is disposed in said handle, comprising:
a hand squeeze member having one end pivotally connected to said handle, wherein said hand squeeze member comprises a curved gear rack;
a gear transmission mechanism operatively connecting to said curved gear rack of said hand squeeze member; and
a power generator which is operatively connected to said gear transmission mechanism and is electrically connected to said control circuit board, wherein when said hand squeeze member is reciprocatingly squeezed with respect to said handle, said power generator is actuated through said gear transmission mechanism for electricity generation so as to charge said high voltage capacitor, wherein said control circuit board is configured to convert a low voltage electricity to a high voltage electricity to be stored in said high voltage capacitor, wherein said discharge button switch is actuated for discharging the electricity in said high voltage capacitor to said swatter net.

2. The battery-free electric mosquito swatter, as recited in claim 1, wherein said gear transmission mechanism comprises a first duplex gear, a second gear, a third gear, a fourth duplex gear, and a fifth output gear orderly connected with each other, wherein said first duplex gear and said fourth duplex gear respectively comprise a pinion gear and a bull gear, wherein said second gear comprises a ratchet wheel, wherein said third gear comprises a pawl, wherein said pinion gear of said first duplex gear serves as an input gear and is meshed with said curved gear rack of said hand squeeze member, wherein said bull gear of said first duplex gear is meshed with said second gear, wherein said ratchet wheel of said second gear and said pawl of said third gear are coaxial and unidirectionally drivably engaged with each other, wherein said pinion gear of said fourth duplex gear is meshed with said third gear, wherein said bull gear of said fourth duplex gear is meshed with said fifth output gear, wherein said fifth output gear is operatively connected to said power generator, such that when said hand squeeze member is reciprocatingly squeezed with respect to said handle, said power generator is actuated through said first duplex gear, said second gear, said third gear, said fourth duplex gear, and said fifth output gear for electricity generation.

3. The battery-free electric mosquito swatter, as recited in claim 2, wherein said handle further comprises a hand squeeze member rotating shaft, a first rotating shaft, a second rotating shaft, and a third rotating shaft, wherein said hand squeeze member is pivotally connected to said handle via said hand squeeze member rotating shaft, wherein said first duplex gear is arranged on said first rotating shaft, wherein said second gear and said third gear are arranged on said second rotating shaft, wherein said fourth duplex gear is arranged on said third rotating shaft.

4. The battery-free electric mosquito swatter, as recited in claim 3, wherein said handle further comprises an upper handle cover, a lower handle cover, and a plurality of cylindrical bores arranged on inner sides of said upper handle cover and said lower handle cover, wherein when said upper handle cover and said lower handle cover are coupled with each other, said hand squeeze member rotating shaft, said first rotating shaft, said second rotating shaft, and said third rotating shaft are rotatably affixed between said cylindrical bores on said inner sides of said upper handle cover and said lower handle cover.

5. The battery-free electric mosquito swatter, as recited in claim 4, wherein said lower handle cover comprises a curvy boss formed on said inner side thereof, wherein said power generator is held at said curvy boss to retain said power generator on said inner side of said lower handle cover, wherein said power generator further comprises a motor plate arranged on an upper part thereof, wherein said motor plate is coupled with said lower handle cover.

6. The battery-free electric mosquito swatter, as recited in claim 5, wherein said pinion gear of said first duplex gear has 10 teeth, said bull gear of said first duplex gear has 40 teeth, and a module (m) thereof is 0.7, wherein said second gear has 11 teeth and a module (m) thereof is 0.7, wherein said third gear has 47 teeth and a module (m) thereof is 0.6, wherein said pinion gear of said fourth duplex gear has 10 teeth and a module (m) thereof is 0.6, said bull gear of said fourth duplex gear has 56 teeth and a module (m) thereof is 0.5, wherein said fifth output gear has 11 teeth and a module (m) thereof is 0.5.

7. The battery-free electric mosquito swatter, as recited in claim 6, wherein said swatter net comprises a positive electrode and a negative electrode connected to two ends of said high voltage capacitor respectively, wherein said discharge button switch is actuated for shorting said positive electrode and said negative electrode to release the electricity to said swatter net.

8. The battery-free electric mosquito swatter, as recited in claim 7, wherein said discharge button switch is arranged on said handle and comprises a button, a spring, a button retaining plate, and a discharge sheetmetal, wherein said button comprises a column arranged on a lower portion thereof, wherein said button retaining plate has a through hole for said column passing through, wherein said button retaining plate is affixed in said handle, wherein said spring is sleeved on said column between said button and said button retaining plate, wherein said discharge sheetmetal is affixed on a bottom of said column.

9. The battery-free electric mosquito swatter, as recited in claim 8, wherein said hand squeeze member comprises a torsion spring and a groove arranged on said end where said hand squeeze member is pivotally connected to said handle, wherein said torsion spring provided in said groove to push said hand squeeze member back to its original after said hand squeeze member is squeezed.

10. The battery-free electric mosquito swatter, as recited in claim 5, wherein said swatter net comprises a positive electrode and a negative electrode connected to two ends of said high voltage capacitor respectively, wherein said discharge button switch is actuated for shorting said positive electrode and said negative electrode to release the electricity to said swatter net.

11. The battery-free electric mosquito swatter, as recited in claim 10, wherein said discharge button switch is arranged on said handle and comprises a button, a spring, a button retaining plate, and a discharge sheetmetal, wherein said button comprises a column arranged on a lower portion thereof, wherein said button retaining plate has a through hole for said column passing through, wherein said button retaining plate is affixed in said handle, wherein said spring is sleeved on said column between said button and said button retaining plate, wherein said discharge sheetmetal is affixed on a bottom of said column.

12. The battery-free electric mosquito swatter, as recited in claim 5, wherein said hand squeeze member comprises a torsion spring and a groove arranged on said end where said hand squeeze member is pivotally connected to said handle, wherein said torsion spring provided in said groove to push said hand squeeze member back to its original after said hand squeeze member is squeezed.

13. The battery-free electric mosquito swatter, as recited in claim 2, wherein said pinion gear of said first duplex gear has 10 teeth, said bull gear of said first duplex gear has 40 teeth, and a module (m) thereof is 0.7, wherein said second gear has 11 teeth and a module (m) thereof is 0.7, wherein said third gear has 47 teeth and a module (m) thereof is 0.6, wherein said pinion gear of said fourth duplex gear has 10 teeth and a module (m) thereof is 0.6, said bull gear of said fourth duplex gear has 56 teeth and a module (m) thereof is 0.5, wherein said fifth output gear has 11 teeth and a module (m) thereof is 0.5.

14. The battery-free electric mosquito swatter, as recited in claim 1, wherein said swatter net comprises a positive electrode and a negative electrode connected to two ends of said high voltage capacitor respectively, wherein said discharge button switch is actuated for shorting said positive electrode and said negative electrode to release the electricity to said swatter net.

15. The battery-free electric mosquito swatter, as recited in claim 14, wherein said discharge button switch is arranged on said handle and comprises a button, a spring, a button retaining plate, and a discharge sheetmetal, wherein said button comprises a column arranged on a lower portion thereof, wherein said button retaining plate has a through hole for said column passing through, wherein said button retaining plate is affixed in said handle, wherein said spring is sleeved on said column between said button and said button retaining plate, wherein said discharge sheetmetal is affixed on a bottom of said column.

16. The battery-free electric mosquito swatter, as recited in claim 1, wherein said hand squeeze member comprises a torsion spring and a groove arranged on said end where said hand squeeze member is pivotally connected to said handle, wherein said torsion spring provided in said groove to push said hand squeeze member back to its original after said hand squeeze member is squeezed.

\* \* \* \* \*